Dec. 10, 1946.   P. D. KILBURY   2,412,407
DEHYDRATOR WITH REMOVABLE TRAYS
Filed Aug. 22, 1944   2 Sheets-Sheet 1
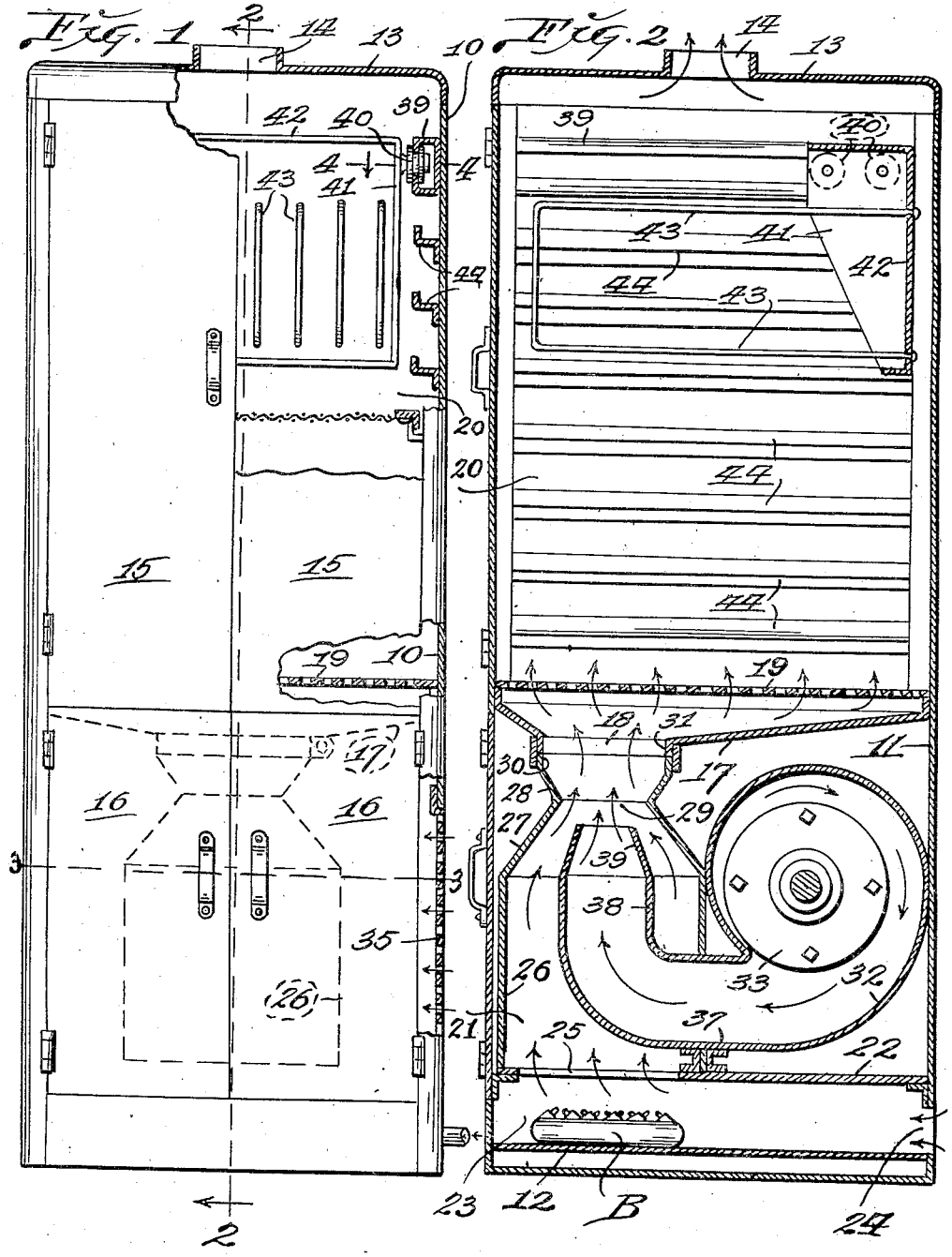
INVENTOR.
PAUL D. KILBURY.
BY
ATTY.

Patented Dec. 10, 1946

2,412,407

UNITED STATES PATENT OFFICE 2,412,407

DEHYDRATOR WITH REMOVABLE TRAYS

Paul D. Kilbury, Hawthorne, Calif., assignor of one-half to John W. Billingsley, Newton, Iowa Application August 22, 1944, Serial No. 550,551

4 Claims. (Cl. 34—197)

My invention relates to a dehydrator of the particular type forming the subject matter of U. S. Letters Patent #2,236,711 issued to my assignee, John W. Billingsley and myself April 1, 1941, and the principal objects of my invention are, to generally improve upon and simplify the construction disclosed in the aforesaid patent as well as other forms of dehydrators, and further, to provide a simple, practical and durable structure, inexpensive of manufacture, which may be conveniently employed for the economical and rapid dehydration of various articles, for instance, laundry or foodstuffs such as fruit, vegetables, meat and the like and for many products which, while being produced or processed, require partial or complete hydration.

A further object of my invention is, to provide a dehydrator in which a venturi is employed for effecting a thorough mixture of heated air with air at normal temperatures and for increasing the flow of such air mixture through the chamber occupied by the articles or products to be dehydrated.

With the foregoing and other objects in view, my invention consists in certain novel features of construction and arrangement of parts which will be hereinafter more fully described and claimed and illustrated in the accompanying drawings in which:

Fig. 1 is a front elevational view of my improved dehydrator.

Fig. 2 is a vertical section taken on the line 2—2 of Fig. 1.

Figure 3:
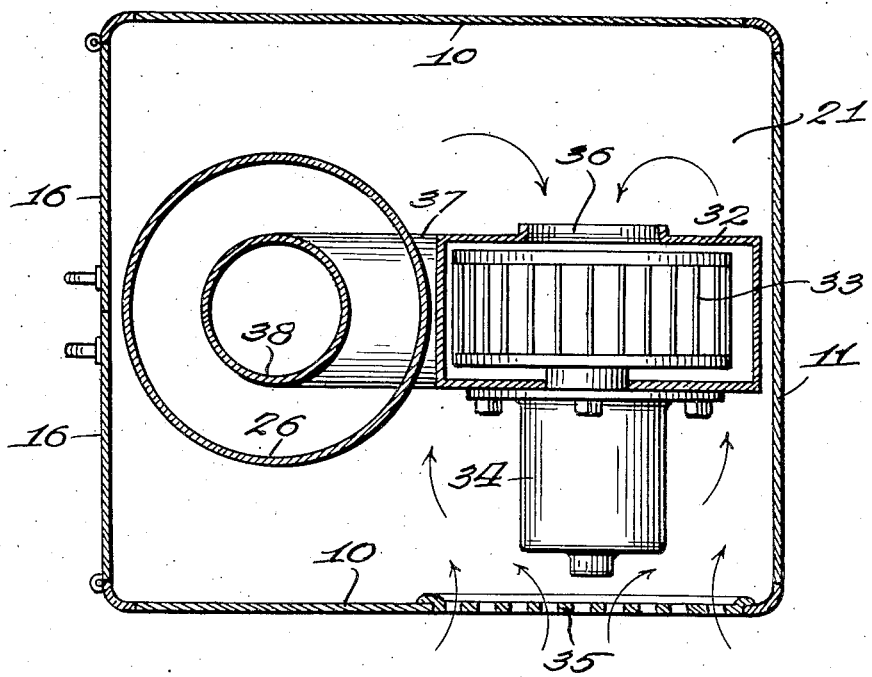
Fig. 3 is an enlarged horizontal section taken on the line 3—3 of Fig. 1.
Figure 4:
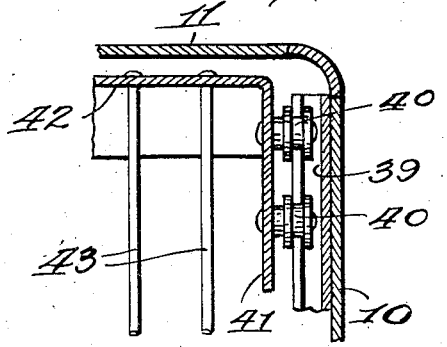
Fig. 4 is a detail section taken on the line 4—4 of Fig. 1.

The body of the dehydrator which is substantially rectangular in shape and constructed preferably from sheet metal, comprises side walls 10, rear wall 11, a bottom 12, a top 13 having an outlet opening 14, a pair of hinged upper front doors 15, and a pair of hinged lower front doors 16.

Positioned within the housing body is a horizontal partition 17 having in its forward portion a fairly large opening 18, and located above and spaced apart from said partition is a perforated plate 19. Thus the space within the housing is divided into an upper hydrating chamber 20 and a lower mixing chamber 21 and a horizontal partition 22 located a short distance above bottom 12 provides below said mixing chamber 21, a shallow air heating chamber 23.

Located in chamber 23 is a heater such as a gas burner B or an electric heater accessible through an opening 24 in the lower portion of rear wall 11 and a fairly large opening 25, partition 22 forms an outlet for the air heated by said burner.

Secured to partition 22 around opening 25, is the lower end of an upright drum 26, the upper portion of the wall of which tapers inward as designated by 27 and then outward as designated by 28, thereby forming a contracted throat 29 and the wall above the outwardly tapered portion 28 terminates in a flange 30, which coincides with and is connected to a flange 31 depending from partition 17 around opening 18.

Suitably secured in the rear portion of chamber 21 behind drum 26 is a substantially circular housing 32 for a fan or impeller 33, that is mounted on the shaft on an electric motor 34.

Seated in the side wall 11 adjacent motor 34 is a perforated plate 35 which admits air at room temperature into chamber 21, and formed in the side wall of housing 32 opposite the wall which carries the motor, is an air inlet 36.

Fan or impeller 33 is eccentrically positioned in the upper portion of housing 32, and leading from the lower portion of said housing is a short horizontal duct 37 which communicates with the open lower end of a tubular elbow 38, the main body portion of which extends axially upward in its drum 26.

The upper end of elbow 38 is tapered as designated by 39 and occupies a concentric position within the tapered portion 27 of drum 26, just below the narrowest portion of contracted throat 29, thus providing a very effective Venturi passageway.

Secured to the inner faces of the upper portions of side walls 10 are channels 39 which serve as tracks traversed by small wheels of flanged rollers 40, that are mounted on the upper portions of the end walls 41 of a sheet metal frame 42.

Secured to the rear wall of this frame are the rear ends of horizontally disposed rack rails 43, from which laundered articles or the like may be suspended.

Secured to the inner faces of side walls 10 below channels 39 in spaced relation are parallel rails 44, which provide supports for removable trays or screen racks that carry articles or products to be dehydrated.

When the upper doors 15 are open, racks 43 may be drawn out and moved in to facilitate the handling of the articles suspended thereupon and also the product containing trays or racks may be moved inward and outward on rails 44.

In operation, air at room temperatures enters chamber 23 through inlet opening 24, is heated by the burning jets of burner B and passes through opening 25 into chamber 26 and throat 29, to dehydrating chamber 20 and discharges therefrom through outlet 14.

Motor 34 when operated drives fan or impeller 33, thus drawing air through perforated plate 38 which air passes over the motor with cooling effect and this air is drawn into housing 32 through opening 36 and by impeller 33 said air is forcibly driven through elbow 38, throat 29 and opening 18, into chamber 20. This jet of air passing through the Venturi passage at the upper end of drum 26, entrains heated air from said drum and thus a substantial volume of air, heated to the desired degree will be delivered to the lower end of the dehydrating chamber to flow upwardly therethrough, thus rapidly and effectively dehydrating the articles or products therein.

Perforated plate 19 is utilized for providing an even distribution of heated air into the dehydrating chamber.

It is to be noted that the relatively heavy parts of the apparatus, viz, the motor, impeller and impeller housing are all located in the lower portion of the housing to the rear of the vertical center thereof, thus effectively counterbalancing the weight of the racks and trays when same are drawn outwardly from the dehydrating chamber to be loaded or unloaded.

Thus it will be seen that I have provided a dehydrator which is simple in structure, inexpensive of manufacture and very effective in performing the functions for which it is intended.

It will be understood that minor changes in the size, form and construction of the various parts of my improved hydrator, may be made and substituted for those herein shown and described without departing from the spirit of the invention, the scope of which is set forth in the appended claims.

I claim as my invention:

1. In a dehydrator, an upright housing, partitions within said housing and dividing the space therein into an upper dehydrating chamber, an intermediate chamber and a lower chamber, the latter having an air inlet, the partition above said lower chamber having an air outlet, there being an opening in the partition below the dehydrating chamber, in vertical alignment with the opening in the partition between the intermediate and lower chambers, a drum within the intermediate chamber for conducting air from the opening in the lower partition to the opening in the partition between the dehydrating and intermediate chambers, said drum provided in its upper portion with a venturi, a housing within the intermediate chamber to the side of said drum, means for admitting air to said last mentioned housing, an impeller arranged for operation within said last mentioned housing, and a duct leading from the impeller housing through the lower portion of said drum, thence upwardly through the center of said drum, into said venturi.

2. A dehydrator as set forth in claim 1, with a heating element located in the lowermost chamber beneath the opening in the lowermost partition.

3. A dehydrator as set forth in claim 1, with means located in the lower portion of the dehydrator chamber for diffusing the air delivered thereinto.

4. A dehydrator as set forth in claim 1, with means removably positioned within said dehydrating chamber for receiving articles and products to be dehydrated.

PAUL D. KILBURY.